(12) United States Patent
Bieker et al.

(10) Patent No.: US 11,691,695 B2
(45) Date of Patent: Jul. 4, 2023

(54) COLLISION SYSTEM FOR FOILING WATERCRAFT

(71) Applicant: Foil Ferry, LLC, Seattle, WA (US)

(72) Inventors: Paul G. Bieker, Anacortes, WA (US); Dalton C. Bergan, Seattle, WA (US); Matthew A. Lankowski, Seattle, WA (US); Kevin J. Reynolds, Seattle, WA (US)

(73) Assignee: Foil Ferry, LLC, Seattle, WA (US)

( * ) Notice: Subject to any disclaimer, the term of this patent is extended or adjusted under 35 U.S.C. 154(b) by 97 days.

(21) Appl. No.: 17/334,211

(22) Filed: May 28, 2021

(65) Prior Publication Data

US 2022/0379998 A1 Dec. 1, 2022

(51) Int. Cl.
*B63B 1/24* (2020.01)
*B63B 1/28* (2006.01)

(52) U.S. Cl.
CPC .............. *B63B 1/244* (2013.01); *B63B 1/285* (2013.01)

(58) Field of Classification Search
CPC ........... B63B 1/24; B63B 1/242; B63B 1/244; B63B 1/285; B63B 1/28; B63B 1/30
USPC .................................. 114/278, 279, 280, 282
See application file for complete search history.

(56) References Cited

U.S. PATENT DOCUMENTS

| | | | | |
|---|---|---|---|---|
| 3,910,215 A | * | 10/1975 | Soderman | B63B 1/30 114/279 |
| 4,010,705 A | * | 3/1977 | Connell | B63B 1/244 114/279 |
| 4,364,324 A | * | 12/1982 | Warner | B63B 1/244 244/102 R |
| 6,782,839 B1 | | 8/2004 | Nozaki | |
| 7,140,318 B1 | | 11/2006 | Gasper | |
| 2004/0154520 A1 | | 8/2004 | Levine | |
| 2016/0214534 A1 | | 7/2016 | Richards et al. | |

FOREIGN PATENT DOCUMENTS

| | | | |
|---|---|---|---|
| GB | 2573160 A | 10/2019 | |
| WO | 2020/056530 A2 | 3/2020 | |
| WO | WO-2022019764 A2 * | 1/2022 | ............. B63B 1/285 |

OTHER PUBLICATIONS

International Search Report and Written Opinion dated Aug. 15, 2022, issued in corresponding International Application No. PCT/US2022/021894, filed Mar. 25, 2022, 20 pages.

* cited by examiner

*Primary Examiner* — Daniel V Venne
(74) *Attorney, Agent, or Firm* — Christensen O'Connor Johnson Kindness PLLC

(57) ABSTRACT

A system for retracting a foil of a watercraft in the event of an impact has a strut extending from a watercraft, the strut has a pivot at one end that connects the strut to the watercraft and allows the strut to articulate around the pivot, a foil attached at a second end of the strut, wherein the foil has sufficient surface area configured to generate positive lift when the watercraft is traveling over water; and a retraction system including a mechanical fuse connected to the strut, the mechanical fuse holds the strut stationary and is subject to forces from the strut when the strut travels through water, the retraction system allows retraction of the strut around the pivot when the strut experiences a force greater than a predetermined limit, and the foil is configured to articulate on the strut to maintain positive lift orientation as the strut is retracting.

2 Claims, 11 Drawing Sheets

COLLISION SYSTEM FOR FOILING WATERCRAFT

BACKGROUND

Watercraft with foils allow the watercraft to be propelled with less energy as there is less water resistance as compared with other hull forms, such as displacement and planing forms. This effect increases at higher speeds because resistance increases to approximately the square power of the speed. This energy reduction results in reductions in greenhouse gas emissions, if using carbon based fuels are burned in to propelling the vessel. This energy reduction means that for certain limited range applications it is now practical to use stored energy, such as batteries, to propel the vessel. Foils create lift for the watercraft beneath the water surface, which minimizes the effect of waves on vessel motions. This results in a smoother ride which can be important for the comfort of crew and passengers. Foils produce less wake as compared to other watercraft forms, such as a displacement hull. Wakes may have a detrimental impact on land-side structures and forms, such as embankments. Watercraft with a displacement hull might have to slow down in certain areas to reduce their wake, whereas a foiling vessel might not. Therefore, improvements in foiling technology can be desirable for incorporating foils into more watercraft.

SUMMARY

A system for retracting a foil of a watercraft in the event of an impact comprises, a strut extending from a watercraft, wherein the strut has a pivot at one end that connects the strut to the watercraft and allows the strut to articulate around the pivot, a foil attached at a second end of the strut, wherein the foil has sufficient surface area configured to generate positive lift when the watercraft is traveling over water, and a retraction system including a mechanical fuse connected to the strut, the mechanical fuse holds the strut stationary and is subject to forces from the strut when the strut travels through water, the retraction system allows retraction of the strut around the pivot when the strut experiences a force greater than a predetermined limit, and the foil is configured to articulate on the strut to maintain positive lift orientation as the strut is retracting.

In one example, the mechanical fuse is located on the strut and releases the strut upon experiencing a force greater than a predetermined limit.

In one example, the retraction system further comprises a linkage connecting the strut to a fixed point, and the mechanical fuse is connected to the linkage, wherein the linkage and the mechanical fuse receives the forces experienced by the strut.

In one example, the system further comprises a tensioner connected to the linkage, the tensioner applies a forward force on the strut through the linkage to maintain the strut in a foiling position, and the mechanical fuse is connected to the linkage or tensioner.

In one example, the system further comprises a first strut and a second strut, both first and second struts extend from the watercraft, both the first and second struts have a pivot at one end that connect each strut to the watercraft and allows the strut to articulate around the pivot; the foil is attached at a second end of each of the first and second struts, wherein the retraction system further comprises a first cable connected to the first strut, a second cable connected to the second strut, a tensioner connected to the first and second cable that applies forward force to maintain the first and second strut in a foiling position, and the mechanical fuse is connected to a point where the first and second cables are joined together or subsequently a tensioner to release the forces when either of the first or the second struts or both experience a force greater than a predetermined limit.

In one example, the system further comprises a third cable and a fourth cable, wherein the third cable connects the first strut to the second strut wherein a force on the first strut is applied to retract the second strut, and the fourth cable connects the second strut to the first strut, wherein a force on the second strut is applied to retract the first strut, wherein the third cable connects a leading edge of the first strut to a trailing edge of the second strut, and the fourth cable connects a leading edge of the second strut to a trailing edge of the first strut.

A system for retracting a foil of a watercraft in the event of an impact comprises, at least one strut which extends from the watercraft, the at least one strut has a pivot at one end that connects the at least one strut to the watercraft and allows the strut to articulate around the pivot, a foil attached at a second end of the at least one strut, wherein the foil has sufficient surface area configured to generate positive lift when the watercraft is traveling over water, and a retraction system including a cylinder having a piston connected to the at least one strut, the piston applies a forward force on the at least one strut through adding pressure to a chamber, and the pressure in the chamber responds to forces on the at least one strut, the retraction system allows retraction of the at least one strut around the pivot when at least one strut experiences a force greater than a predetermined limit, and the foil is configured to articulate on at least one strut to maintain positive lift orientation as at least one strut is retracting.

In one example, the chamber relieves pressure at a predetermined limit to allow retraction of the at least one strut when the at least one strut experiences a force greater than a predetermined limit.

In one example, the system further comprises a first strut and a second strut, both the first strut and second struts extend from the watercraft, both the first and second struts have a pivot at one end that connect each strut to the watercraft and allows the struts to articulate around the respective pivot, the foil is attached at the lower end of each of the first and second struts, the retraction system further comprises: a first cable connected to the first strut, and a second cable connected to the second strut, wherein the first cable and the second cable are connected to the piston, the piston applies a forward force on the first and second struts through adding pressure to a chamber, and the pressure in the chamber responds to forces on the first and second struts, the retraction system allows retraction of the first and second struts around the pivots when at least one strut experiences a force greater than a predetermined limit to relieve the pressure in the chamber, and the foil is configured to articulate on the first and second struts to maintain positive lift orientation as first and second struts are retracting.

In one example, the system further comprises a first strut and a second strut, both the first strut and second struts extend from the watercraft, both the first and second struts have a pivot at one end that connect each strut to the watercraft and allows the strut to articulate around the respective pivot, the foil is attached at the lower end of each of the first and second struts, the retraction system further comprises: a first cylinder with a first piston connected to the first strut, wherein the first piston applies a forward force on the first strut through adding pressure to a first chamber of the first cylinder, and the pressure in the first chamber responds to forces on the first strut, and a second cylinder with a second piston connected to the second strut, wherein the second piston applies a forward force on the second strut through adding pressure to a second chamber of the second cylinder, and the pressure in the second chamber responds to forces on the second strut, wherein the retraction system allows retraction of the first and second struts around the pivots when either the first or second strut experiences a force greater than a predetermined limit that relieves the pressure in either the first or second chamber, and the foil is configured to articulate on the first and second struts to maintain positive lift orientation as first and second struts are retracting.

In one example, the system further comprises a pressure relief valve connected to the first chamber and a second pressure relief valve connected to the second chamber.

In one example, the system further comprises a first sensor to indicate position of the first piston and a second sensor to indicate position of the second piston, and a controller controls retraction of the first or second strut to retract the first and second struts in unison.

In one example, the system further comprises a manifold of valves that is configured to relieve pressure from one cylinder to the other, wherein the first and second cylinders each include a pressure side chamber and a tank side chamber separated by the respective piston, wherein each pressure side chamber relieves pressure at a predetermined limit to the tank side chamber of the opposite cylinder.

In one example, the system further comprises a first accumulator connected to the first chamber and a second accumulator connected to the second chamber, wherein the first and second accumulators.

In one example, the system further comprises a first pressure sensor to sense pressure in the first chamber, a second pressure sensor to sense pressure in the second chamber, and a controller to control one or more valves to relieve pressure in either the first or second chamber when one of the first or second chambers is relieved of pressure when either the first or second strut experiences a force greater than a predetermined limit.

In one example, the system further comprises a radar for detecting objects in the water, wherein the retraction system is controlled by the radar.

In one example, the foil includes a pivot connecting the foil to the strut, wherein the foil articulates around the pivot with respect to the strut, and the foil is further connected to a system configured to maintain an angle of attack of the foil.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
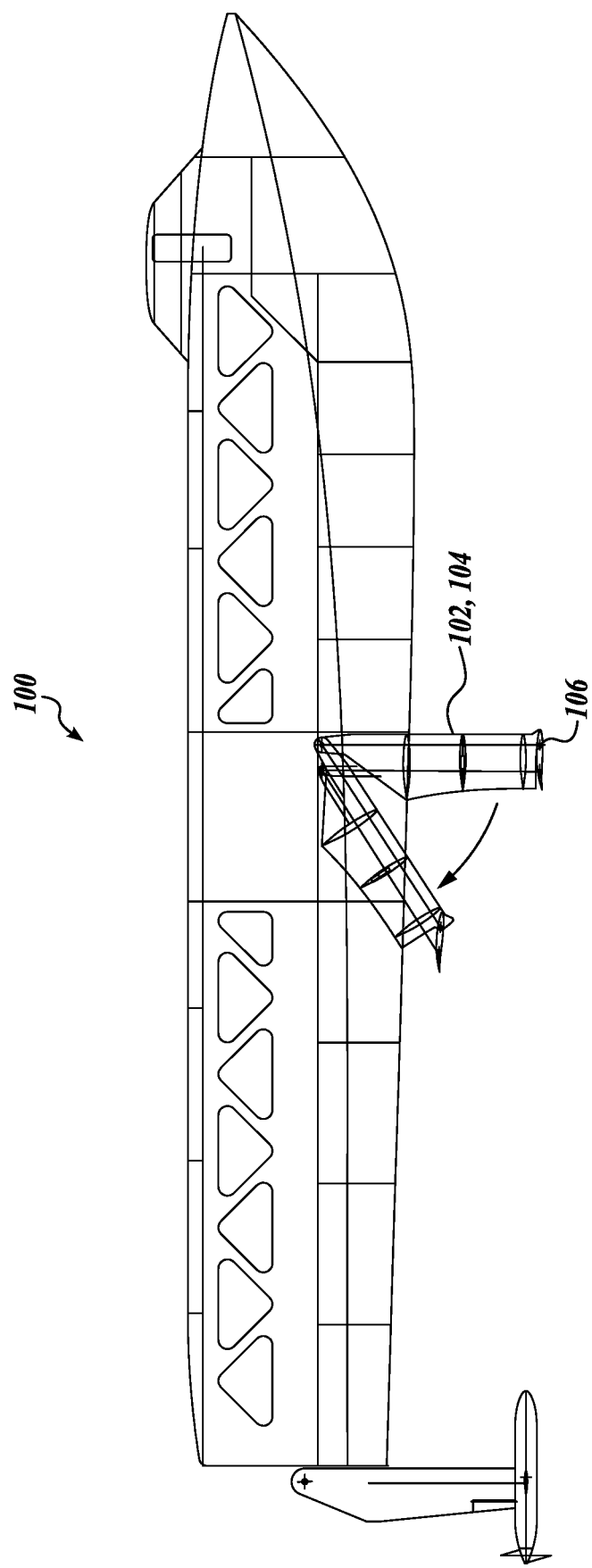
FIG. 1 is a diagrammatical illustration of a foiling watercraft with a collision system.

The advantages of foiling watercraft are significant. However, foils are subject to failure if they hit submerged objects such as logs, parts of trees, such as stumps, and other debris. There are several challenges with hitting such objects. The foil, strut, propulsion system, and associated systems may get damaged. This may leave the vessel stranded requiring rescue by tugboats and delay the delivery of cargo and passengers. Damage to the vessel may be expensive to repair. Further repairs may delay the vessels return to service resulting in loss of revenue, contracts, and reputation. Substantial strikes could result in decelerations that cause injury to marine vessel crew and passengers. Such decelerations could also damage marine vessel equipment, such as dislodging a machine from its foundation, breaking a window, or losing deck equipment. A certain type of strike is of special concern. It is possible that the associated strut(s) could rotate aft such that the stricken foil directs the motion of the vessel down towards the water. In such a case, the bow of the vessel might be accelerated into the water. At higher speeds such a crash could cause substantial damage to equipment and harm to crew and passengers.

A collision system is disclosed that allows the strut(s) that connect the foil(s) to the hull(s) to retract (rotate aft) when impacted by certain forces while maintaining positive lift on the foil and reducing the consequences to the vessel. In some examples, a mechanical fuse, such as a shear pin is designed to fail before the catastrophic structural damage occurs to the hull, strut or foils. In some examples, the rate of retraction can be controlled. Retraction helps to absorb some of the energy of the impact as the impulse from the impact is spread over a longer distance and time which reduces the force and thus likelihood of structural damage. Further, by using radar to detect objects in the water prior to impact, the struts and foils can be activated to retract prior to impact, further reducing impact loads.

In some cases, it may be necessary to control the foil angle of attack to prevent a nosedive of the watercraft while retracting the foil(s) and strut(s). The angle of attack means the relative direction of the foil's lift as compared to the horizon. Controlling this angle of attack allows several things. Keeping the angle of attack aligned with the horizon prevents the foil(s) from driving the bow of the vessel down into the water. Actively controlling the angle of attack, such as to be above the horizon, allows a soft landing for the marine vessel when the strut retracts. In some embodiments, the hydrofoil is designed to maintain positive lift while the strut retracts during collision and the vessel comes down from foiling. For example, the hydrofoil can be connected to a linkage that keeps the hydrofoil in an orientation to generate positive lift while the strut retracts.

In some cases, the impact may occur closer to one side of the foil than the other, causing the impact forces on a strut closer to the point of impact to be greater than the impact forces on a strut further from the point of impact. If the strut experiencing the greatest force retracts substantially before the other strut this could cause significant stress (primarily torsional) in the foil and struts resulting in failure and may also cause uncontrolled lateral motion of the vessel. Controlling the struts such that they retract in unison reduces these consequences. A retraction system can also be configured to return the strut and foil back to the original position after an initial impact. This disclosure offers examples of mechanical and hydraulically powered retraction systems to address the above noted challenges. The examples are provided with the understanding that features of one example can be applied to all other examples.

In FIG. 1, a foiling watercraft 100 is illustrated with a retracting strut-foil assembly. The foiling watercraft 100 can be a passenger ferry. However, this disclosure can be applied to any type of foiling watercraft having any number of strut-foil assemblies.

In the illustrated watercraft 100, the strut-foil assembly is comprised of two struts 102, 104 on the starboard and port sides respectively, and one hydrofoil 106. As used in this disclosure "foil" and "hydrofoil" are used interchangeably. This disclosure is applicable to hydrofoils supported by a single strut and to hydrofoils supported by more than two struts. This disclosure provides examples of systems allowing retraction to one or multiple struts when either a strut or foil is subjected to a collision.

According to this disclosure, where a single strut or two struts are used, the strut or struts are connected to the hull of the vessel in any manner that allows the struts to swing or pivot to the rear of the vessel.

A hydrofoil 106 as used in this disclosure is a structure having upper and lower surfaces designed to generate lift as the vessel travels through the water, and upon reaching a designated speed, the hydrofoil generates sufficient lift to raise the vessel above the water so that the hull is no longer in contact with the water. A hydrofoil 106 may have positive buoyancy, however, buoyancy is not the main principle that a hydrofoil uses to generate lift. A hydrofoil as used in this disclosure is designed to generate lift when traveling in water. A hydrofoil can lose lift when the top surface of the hydrofoil is above the water surface; however, some parts of the hydrofoil can pierce the water surface and still generate sufficient lift. A hydrofoil as used in this disclosure excludes structures, such as a ski that is designed principally for riding on the surface of water. A hydrofoil as used in this disclosure also excludes structures, such as pontoons or floats that are designed to have sufficient buoyancy so that the vessel is supported over the surface of the water even when the vessel is stopped. A hydrofoil cross-sectional shape generally thickest about ⅓ from the leading edge in some examples. The hydrofoil thickness reduces from the point of maximum thickness to the trailing edge, mainly, by a decrease in the angle of the upper surface. A hydrofoil has its greatest dimension from side to side on a vessel. The front to back (chord) dimension of a hydrofoil is typically at least five time greater than the thickness of the hydrofoil. This disclosure encompasses the use of any hydrofoil regardless of design as long as it is a structure designed to generate lift of a vessel when the hydrofoil is traveling through and in the water.

The struts 102, 104 are designed to support the weight of the vessel, while providing an efficient sectional profile to reduce drag through the water. Generally, the struts 102, 104 have the greatest dimension being the height measured from the vessel to the hydrofoil 106. The hydrofoil 106 is connected to the bottom of each strut 102, 104.

The retracting strut or struts are normally in a foiling position, meaning that the struts are held in a down position under tension or fixed stationarily, depending on the retraction system. The strut or struts are caused to retract when experiencing a force greater than a predetermined limit, such as when colliding with an object. The strut or struts then swing up or to the rear of the vessel in order to minimize damage caused by the impact. In the foiling position, the struts 102, 104, are positioned so that the strut length is generally aligned vertically. When retracting, the strut or struts can swing back by rotating around a pivot at the upper end of the struts. During retraction of a strut, the leading edge of the strut becomes diagonal or even horizontal. In some examples, as the strut(s) pivot aft additional pivot points at the attachment to the foil and to the linkage controlling the foil allow the foil to maintain positive lift. In this disclosure, a pivot is any mechanical part or parts that allows the strut to retract to the back and up.

Figure 2:
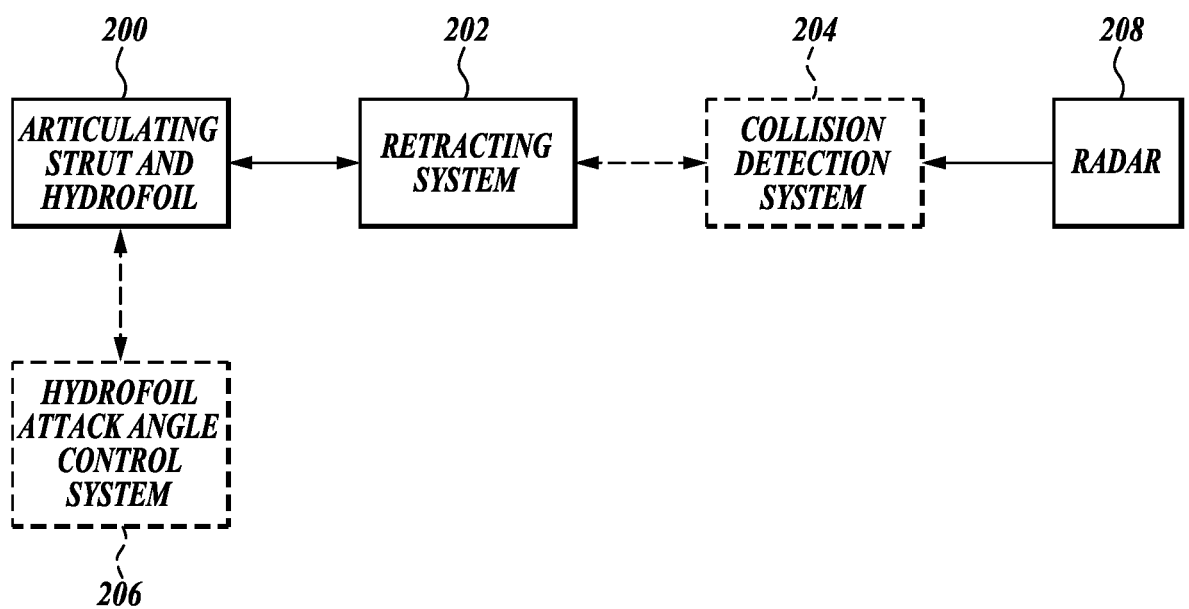
FIG. 2 is a schematic illustration of the parts of a collision system.

FIG. 2 is a schematic illustration showing the parts of a hydrofoil collision system. The articulating strut and hydrofoil assembly 200 can include one or more struts supporting each hydrofoil.

The one or more struts are connected to the vessel in any manner that allows the struts to retract, pivot or swing up from the foiling position. In one embodiment, a strut can be attached to the hull to pivot at the upper end of the strut. In one embodiment, the pivot includes a shaft on either the strut or hull and a corresponding bearing surface or surfaces to allow rotation of the strut with respect to the shaft. However, a pivot is any mechanism that allows the strut to move up or at an incline to the rear, including shafts and bearing combinations, and the like.

The strut-hydrofoil assembly 200 is connected to a retracting system 202. Examples of retracting system 202 are configured to retract a strut-hydrofoil assembly upon the strut experiencing a force greater than a predetermined limit. Examples of the retracting system 202 may use any one or more of mechanical, hydraulic, and electronic components and combinations to cause the retraction of the strut-hydrofoil assembly 200. Particularly, when a hydrofoil is supported by more than one strut, the retracting system can be configured to retract each strut connected to the hydrofoil. As the strut or struts are retracting, the foil is configured to articulate on the strut or struts to maintain positive lift orientation as the strut or struts are retracting.

In one embodiment, the retracting system 202 can be actuated by a collision detection system 204. In one embodiment, the collision detection system 204 includes a radar 208 for detecting objects on or near to the surface of the water. The radar 208 uses a control system that can calculate the time to impact based on the vessel's speed and the distance to the objects. If the vessel does not have time to avoid the object, the operator of the vessel can select to retract the strut-hydrofoil assemblies. Alternatively, the decision to retract the strut-hydrofoil assemblies can be controlled by a microprocessor controller. For example, the vessel can reduce speed and begin retracting the strut-hydrofoil assemblies.

In one embodiment, each strut-hydrofoil assembly 200 is connected to a hydrofoil attack angle control system 206. In one embodiment, the aim of the secondary pivot attached to the top of hydrofoil attack angle control system is to maintain hydrofoil at a consistent angle with respect to the vessel as the angle of the strut changes during retraction.

In one embodiment, the hydrofoil 106 can articulate with respect to the struts so that the angle of attack of the hydrofoil can be changed to adjust for changing conditions. The angle of attack of a hydrofoil can be defined by the angle a chord of the hydrofoil makes with respect to the flow direction of water. The chord of the hydrofoil is a straight line from the leading edge to the trailing edge. The leading edge can be defined as the forwardmost point and the trailing edge can be defined as the rearmost point of the hydrofoil at the middle of the length of the hydrofoil. In one embodiment, when the hydrofoil uses a straight lower surface, the angle of attack of such hydrofoil can be defined by the angle the lower surface makes with the direction of water flow.

Herein are examples of retracting systems used with strut-foil assemblies which when subjected to any sudden load, such as through impact on any part of the struts or hydrofoil, the retracting system is capable of retracting one strut or two struts in unison.

Figure 3A:
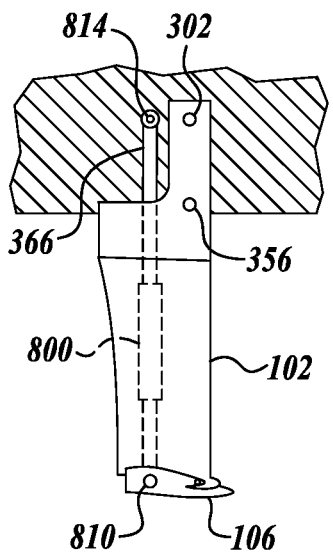
FIG. 3A is a schematic illustration of a strut-hydrofoil assembly having a retraction system with a mechanical fuse.
Figure 3B:
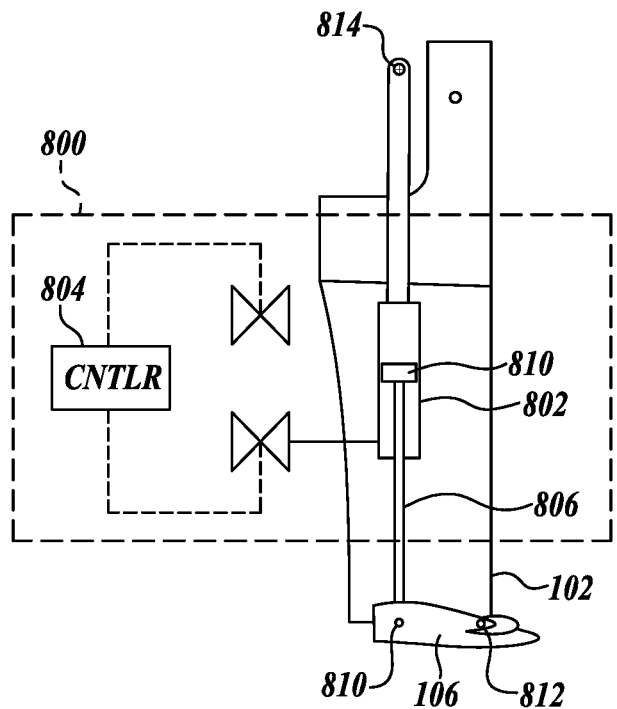
FIG. 3B is a schematic illustration of the strut-hydrofoil assembly of FIG. 3A illustrating the foil angle of attack controller.
Figure 3C:
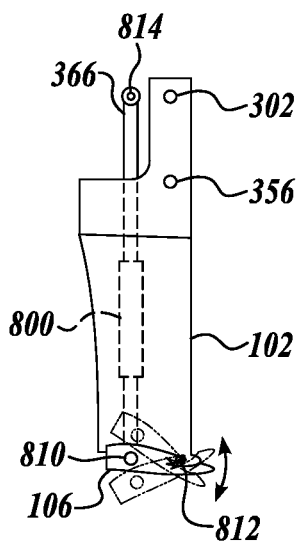
FIG. 3C is a schematic illustration of the strut-hydrofoil assembly of FIG. 3A showing articulation of the foil.

FIGS. 3A to 3C illustrate one example of a retraction system and strut-hydrofoil assembly designed to retract when the strut 102 and or foil 106 experiences a force greater than a predetermined limit, and the foil 106 is configured to articulate on the strut 102 to maintain positive lift orientation as the strut 102 is retracting. The retracting system includes any manner of pivoting the strut 102. Here, the top end of the strut 102 is connected to the hull at a pivot 302 that allows the strut 102 to swing to the rear. The retracting system includes a mechanical fuse 356 to hold the strut 102 in a position for foiling. The mechanical fuse 356 functions to hold the strut 102 stationary to the hull or other structure in the foiling position without retraction, while receiving the forces experienced by the strut 102. In one embodiment, the location of mechanical fuse 356 on the strut 102 is offset from the pivot 302.

The mechanical fuse 356 is any part in the retracting system designed to give way or break at a predetermined load. The mechanical fuse 356 is usually the weakest link added in the system to protect the more critical or expensive components of the system. One example of a mechanical fuse is a shear pin 356 which reacts to forces when the strut 102 is traveling through the water. However, other mechanical fuses can be used in the example of FIGS. 3A to 3C.

In the examples, the hydrofoil 106 can articulate with respect to the strut 102 in order to maintain positive lift orientation as the strut 102 retracts to the rear. Each strut 102 and 104 of the following examples in FIGS. 3 to 9 can include an arm 366 (and 368) and an actuator shown here as a hydraulic flight control system 800, respectively, that maintains the hydrofoil 106 in the orientation designed to be at the nominal angle of attack for the designed speed and nominal strut orientation. The arm 366 is connected on top at a pivot 814 allowing the arm 366 to rotate. Arm 366 is connected at the bottom pivot 810 and may include a flight control system 800. The actuator shown is a hydraulic cylinder and system used for normal flight control can be enclosed within the respective strut 102, 104.

Referring to FIG. 3B, the flight control system 800 includes a double-acting hydraulic cylinder 802 with a piston 810 connected to a ram arm 806 that is connected to the bottom pivot 810. A further pivot 812 on the front of the hydrofoil 106 allows the hydrofoil 106 to rotate with respect to the strut 102 as illustrated in FIG. 3C. Referring to FIG. 3B, the piston 810 divides two chambers which can be filled with hydraulic fluid by operation of valves leading to the respective chambers. In one embodiment, the hydraulic flight control system 800 on the arm 366 can be used for flight control during foiling. A controller 804 is used to open and close respective valves to the chambers to move the piston 810 in either of two directions depending on logic using a sensor. In one embodiment, the position sensor can sense the height of the vessel above the water and the angle of attack of the hydrofoil 106 can be set. However, other control schemes for flight control are possible.

When the strut 102 retracts due to an impact that overcomes the designed breaking point of the mechanical fuse 356, the flight control system 800 if implemented is not required to respond instantaneously to avoid a severe nose-dive crash of the vessel. Arm 366 together with the ram arm 806 of the flight control system 800 rotate aft in parallel with the strut 102 at a fixed length so that the arm 366 together with the ram arm 806 can rotate the hydrofoil 106 simultaneously relative to the strut as the strut 102 is retracting which maintains the positive lift orientation on the foil as long as the watercraft 100 continues to move. Arms 366 within the strut 102 can also provide a structural connection between the strut and the hull in addition to the support being provided by the struts. Although the hydraulic flight control system is described with respect to FIGS. 3A, 3B, and 3C, the hydraulic flight control system 800 is used in the examples of FIGS. 4 through 11 and is understood to function in the same manner as described. Furthermore, in systems including two struts, a second strut will also include an arm 368 and flight control system 800 that functions similarly to the arm 366 and flight control system 800 described.

Figure 4:
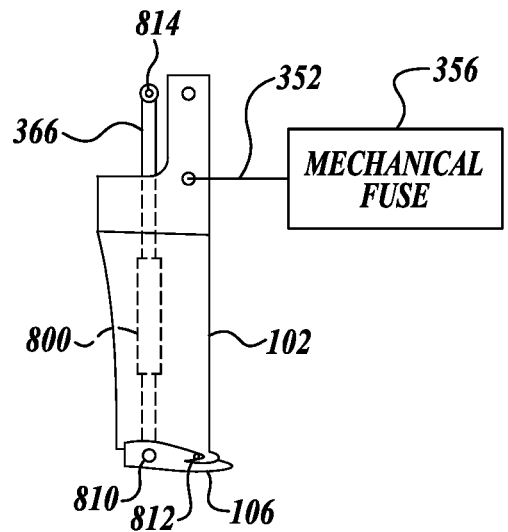
FIG. 4 is a schematic illustration of a strut-hydrofoil assembly having a modified retraction system of FIG. 3A.

FIG. 4 is another example of a retraction system and strut-hydrofoil assembly designed to retract when the strut 102 experiences a force greater than a predetermined limit and the foil 106 is configured to articulate on the strut 102 to maintain positive lift orientation as the strut 102 is retracting. FIG. 4 shows a modification to the system in FIGS. 3A to 3C where like numbers represent like parts. The modification includes adding a linkage 352 connecting the strut 102 to any fixed point on the hull to keep the strut 102 in the foiling position. The linkage 352 can extend into the hull of the vessel and can be accessible for personal to operate the linkage 352. The connection of the linkage 352 to the strut 102 should be offset from the pivot 302. In this way, pulling forward on the linkage 352 can provide leverage to return the strut 102 to the foiling position after the strut 102 is retracted. The mechanical fuse 356 is shown attached to the linkage 352. Accordingly, both the linkage 352 and the mechanical fuse 356 are subjected to the forces experienced by the strut 102. The linkage 352 can include rigid strops or flexible synthetic or steel cables.

Figure 5:
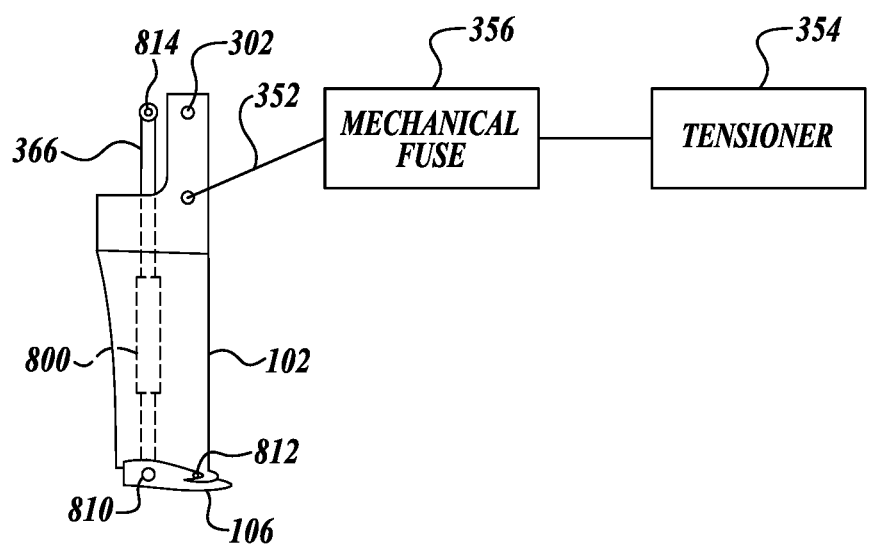
FIG. 5 is a schematic illustration of a strut-hydrofoil assembly having a modified retraction system of FIG. 4.

FIG. 5 is another example of a retraction system and strut-hydrofoil assembly designed to retract when the strut 102 experiences a force greater than a predetermined limit and the foil 106 is configured to articulate on the strut 102 to maintain positive lift orientation as the strut 102 is retracting. FIG. 5 shows a further modification to the system of FIGS. 3A to 3C where like numbers represent like parts. The modification includes adding the linkage 352 connecting the strut 102 to a fixed point on the hull, the mechanical fuse 35 connected to the linkage 352, and further includes a tensioner 354 to enable adding forward tension to the strut 102. The tensioner 354 can include, for example, a turnbuckle, a highfield lever, and the like. Accordingly, the linkage 352, mechanical fuse 356, and the tensioner are subjected to the forces experienced by the strut 102.

Figure 6:
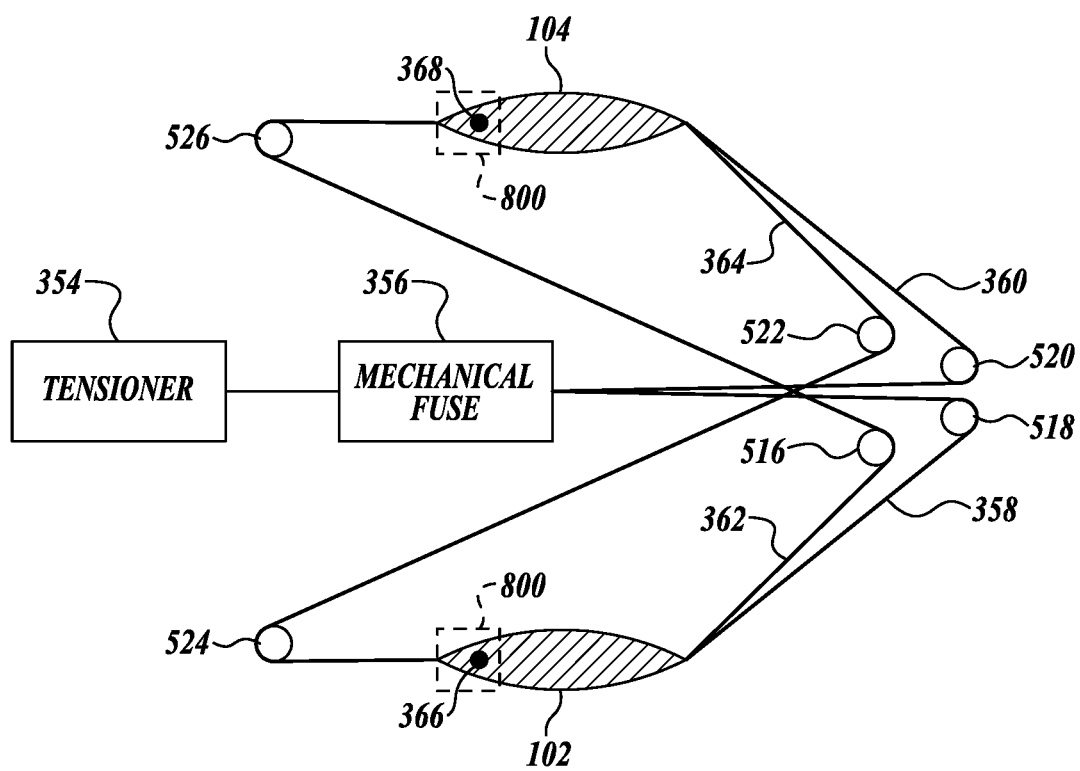
FIG. 6 is a schematic illustration of a strut-hydrofoil assembly having a retraction system of FIG. 5 modified for synchronizing two struts.

FIG. 6 is another example of a retraction system and strut-hydrofoil assembly designed to retract when either strut 102 or 104 or both experience a force greater than a predetermined limit and the foil is configured to articulate to maintain positive lift orientation as the struts are retracting. FIG. 6 shows the system of FIG. 5 where like numbers represent like parts modified to apply to systems including two struts, such as a starboard strut 102 and port strut 104, and a single foil (not shown) that is connected to the bottoms of struts 102, 104. Herein, starboard strut 102 and port strut 104 may be called first strut 102 and second strut 104. In a two strut system, the second strut 104 also includes an arm 368 and flight control system 800 which operates similarly to the arm 366 and flight control system described with respect to FIGS. 3A to 3C.

In the retracting system of FIG. 6, two mechanical linkages 358 and 360 are shown connecting the starboard strut 102 and port strut 104 to a single mechanical fuse 356 and tensioner 354. In the example of FIG. 6, the linkages 358 and 360 can include cables fastened to the leading edges of struts 102, 104, the cables 358, 360 travel around forward-placed sheaves 518, 520 respectively, then, are connected to the mechanical fuse 356 and tensioner 354. The illustrated arrangement of cables and sheaves is only schematic to illustrate an example; however, other arrangements of linkages and sheaves may be used to accomplish the aims of the retracting system herein described. The cables 358, 360 can be made from a low-stretch synthetic material or metal. The tensioner 354 functions as in other examples to apply a forward tension to struts 102 and 104 to maintain the struts 102, 104 down when foiling. The tensioner 354 and mechanical fuse 356 are subjected to the forces from the struts 102, 104, such that the mechanical fuse 356 functions to release tension on the cables 358 and 360 to allow the struts 102, 104 to retract when either or both struts experience a force greater than a predetermined limit.

In a further modification of a two-strut system, optionally, a second cable 362 is connected to the leading edge of the starboard strut 102. The cable 362 is routed around a forward sheave 516 and rear sheave 526 to redirect the second cable 362 to connect to the trailing edge of the port strut 104. Similarly, an optional second cable 364 is connected to the leading edge of the port strut 104 which is routed around a forward sheave 522 and rear sheave 524 to redirect the second cable 364 to connect to the trailing edge of the starboard strut 102. The cables 362 and 364 work to retract both struts 102, 104 in unison. For example, upon receiving an impact sufficient for the mechanical fuse 356 to give way, releasing the forward tension on the struts 102, 104, one or both of the struts 102, 104 begin to retract to the rear due to momentum of the vessel or because of the object that was struck, which causes the second cables 362, 364 to pull on the opposite strut from the trailing edge to retract both struts 102, 104 at the same rate in unison. Especially when the strike occurs near or outboard of one strut resulting one strut experiencing more force than the other The illustrated arrangement of the cables is one example. The number and positioning of cables, sheaves, mechanical fuse, and tensioner can be adapted to the particular application and vessel. Further, dampening devices may be connected to any of the linkages so as to dampen any sudden forces. A sacrificial crash box behind the strut built into the vessel may also serve to dampen the sudden forces.

Figure 7:
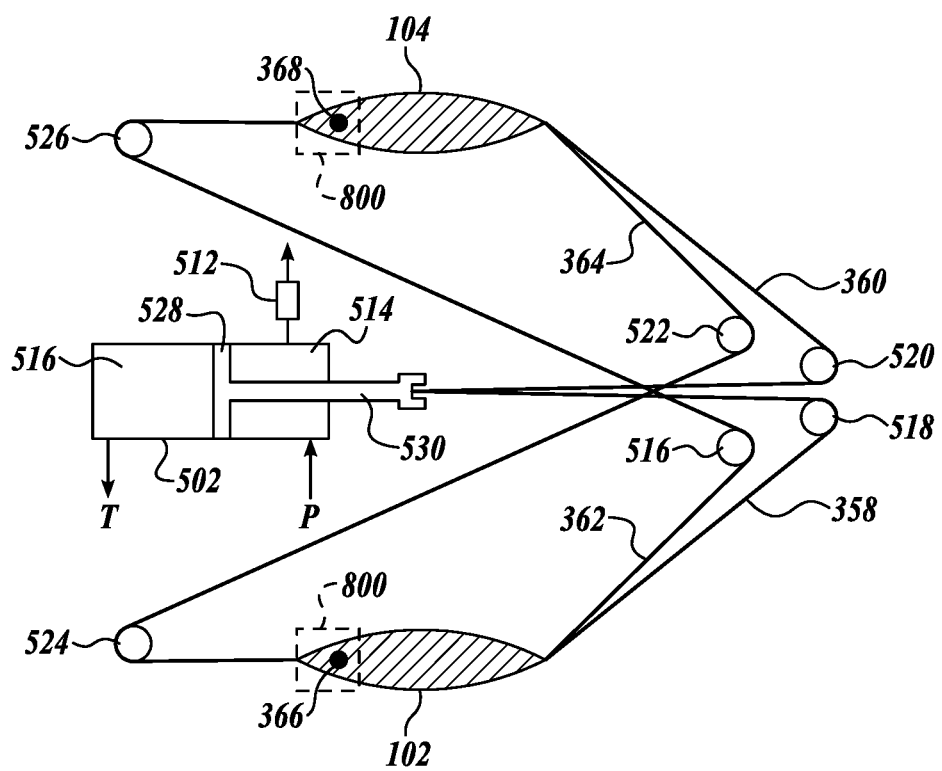
FIG. 7 is a schematic illustration of a strut-hydrofoil assembly having a retraction system of FIG. 6 powered with hydraulic cylinders.

FIG. 7 illustrates another example of a retraction system and strut-hydrofoil assembly designed to retract when either strut 102 or 104 or both experience a force greater than a predetermined limit and the foil is configured to articulate to maintain positive lift orientation as the struts are retracting. FIG. 7 shows a modification to the cable system of FIG. 6 where like numbers represent like parts. The modification includes replacing the mechanical fuse 356 and tensioner 354 with a single-acting or double-acting hydraulic cylinder 502. The cylinder 502 can both function to apply forward tension on struts 102, 104 and can also release the tension when one or both struts 102, 104 experience a force greater than a predetermined limit. In FIG. 7, the struts 102 and 104 are connected to a single tensioning cylinder 502 via the system of cables 358, 360 passing over respective forward-placed sheaves 518, 520 as described. Here, instead of connecting to the tensioner or mechanical fuse, the cables 358, 360 are connected to the cylinder 502.

The cylinder 502 includes a piston with a ram arm connected to the cables 358, 360. As already described, a second optional cable 362 can be connected to the leading edge of the strut 102. The cable 362 is routed around a forward sheave 516 and rear sheave 526 to redirect the second cable 362 to connect to the trailing edge of the second strut 104. Similarly, a second optional cable 364 is connected to the leading edge of the strut 104 which is routed around a forward sheave 522 and rear sheave 524 to redirect the second cable 364 to connect to the trailing edge of the first strut 102.

The piston divides the cylinder 502 into a pressure side chamber 514 and a tank side chamber 516. When pressure is admitted into the pressure side chamber 514, the piston is forced to move to the tank side chamber 516, which expels fluid to a tank. This creates a force that applies tension on the leading edges of the struts 102, 104 through the cables 518, 520, thus maintaining the struts 102, 104 in the un-retracted forward position when the vessel is traveling at foiling speeds. The struts 102, 104 are prevented from traveling further forward beyond the designed position by any structure serving to stop the forward movement. In one example, the cylinder 502 is a single-acting cylinder which can only apply pressure to the chamber 514, thus the cylinder 502 applies force in a single direction. In another example, a double-acting cylinder can be used wherein the chambers on both sides of the piston can allow pressure in, and both chambers are also configured to vent to the tank, which allows a double-acting cylinder to apply force in two directions directly opposite to each other. A series of valves or a manifold is used to control the admission of pressure to the chambers and to allow the venting of chambers to the tank depending on the direction of the force to be applied.

The pressure of the pressure side chamber 514 is subjected to the forces on the struts 102, 104 via the cables 358, 360. Thus, if one or both struts 102, 104 suddenly collide, the pressure will rise in the pressure side chamber 514. In one embodiment, the pressure side chamber 514 is connected to a pressure relief valve 512 designed to relieve the pressure within the chamber 514 at a predetermined pressure limit and at a predetermined flowrate of fluid. Upon impact to one or both struts 102, 104, or the hydrofoil 106, the impact raises the pressure within chamber 514 beyond a predetermined limit of the relief valve 512 causing the valve 512 to open and release the pressure in chamber 514 and thereby releases the forward tension on both struts 102, 104 allowing retraction and impact absorption. As one or both of the struts 102, 104 begin to retract to the rear due to momentum of the vessel or because lift from the foil 106 can also cause retraction of the struts, the second cables 362, 364 will pull on the opposite strut to retract both struts 102, 104 at the same rate in unison.

Figure 8:
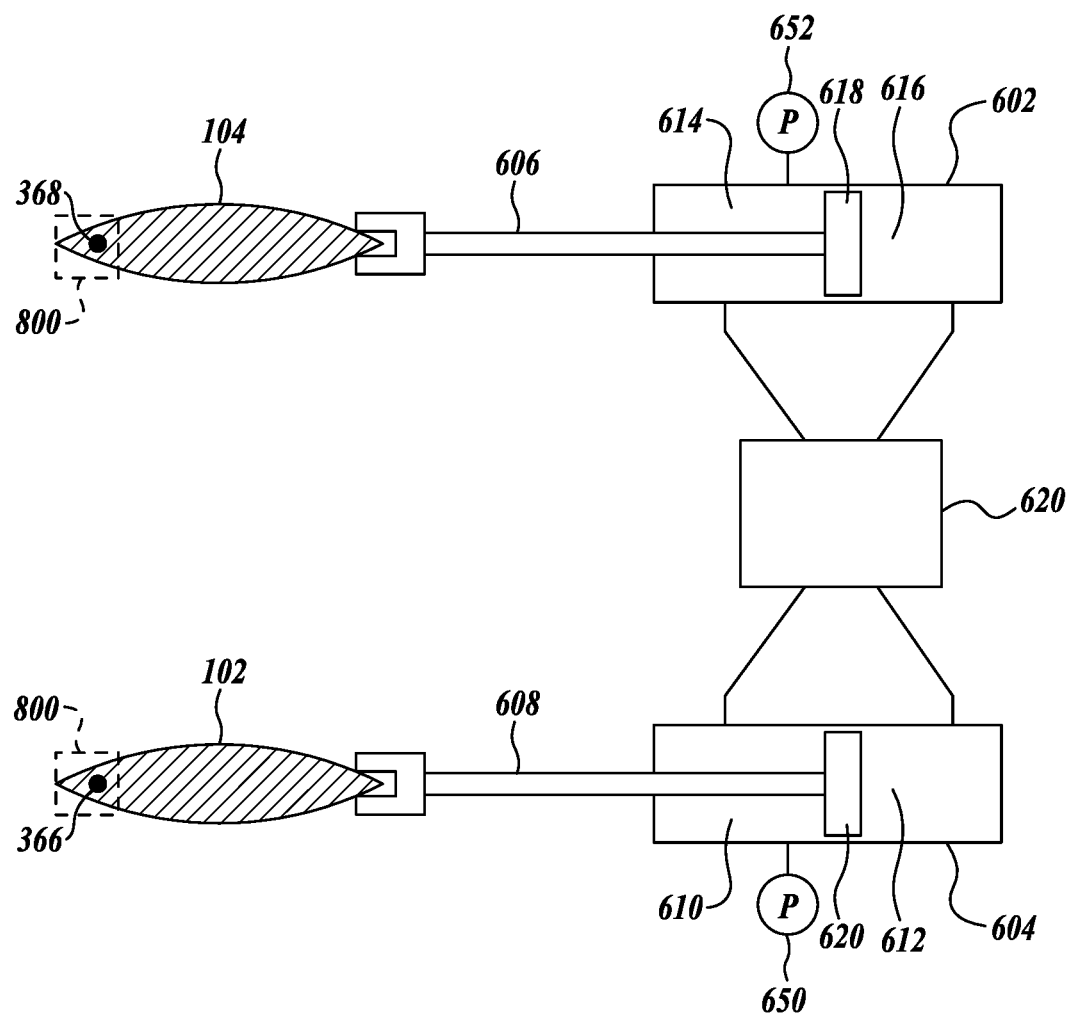
FIG. 8 is a schematic illustration of a strut-hydrofoil assembly having a retraction system for two struts powered with hydraulic cylinders.

FIG. 8 illustrates another example of a retraction system and strut-hydrofoil assembly designed to retract when either strut 102 or 104 or both experience a force greater than a predetermined limit and the foil 106 is configured to articulate to maintain positive lift orientation as the struts are retracting. FIG. 8 has struts 102 and 104 as described in the foregoing examples wherein like numbers represent like parts. The retracting system of FIG. 8 includes a double-acting hydraulic cylinder 604 and 602 connected, respectively, to strut 102 and 104. Here, the control of retraction of the struts 102, 104, particularly the strut that is not impacted, is accomplished by a transferring of the hydraulic fluid from one cylinder to the other.

The hydraulic cylinder 604 has a piston 620 separating two chambers, wherein chamber 610 is the pressure side chamber and chamber 612 is the tank side chamber under foiling conditions. The pressure side chamber 610 applies tension on the piston 620 to keep the strut 102 in the un-retracted down position. The pressure within chamber 610 can be monitored with a pressure sensor 650 to apply the correct amount of tension on the strut 102 and to determine when an impact occurs. The hydraulic cylinder 602 has a piston 618 separating the two chambers, wherein chamber 614 is the pressure side chamber and chamber 616 is the tank side chamber under foiling conditions. The pressure side chamber 614 applies tension on the piston 618 to keep the strut 104 in the un-retracted down position. The pressure within chamber 614 can be monitored with a pressure sensor 652 to apply the correct amount of tension on the strut 104 and to determine when an impact occurs. The pressure in chamber 610 is subjected to forces experienced by the strut 102, and the pressure in chamber 614 is subjected to forces experienced by the strut 104.

The retracting system of FIG. 8 uses a manifold 620 that controls the flow of hydraulic fluid between the double-acting hydraulic cylinders 602, 604 such that when high pressure is sensed in one of the pressure side chambers 610 or 614 due to impact, the pressure is relieved to tank side chamber 612 or 614 of the opposite hydraulic cylinder. The hydraulic cylinder of the non-impacted strut similarly relieves the pressure from the pressure side chamber to the tank side chamber of the opposite hydraulic cylinder. Accordingly, retraction of both the impacted and the non-impacted struts in unison can be accomplished with the retraction system of FIG. 8.

Figure 9A:
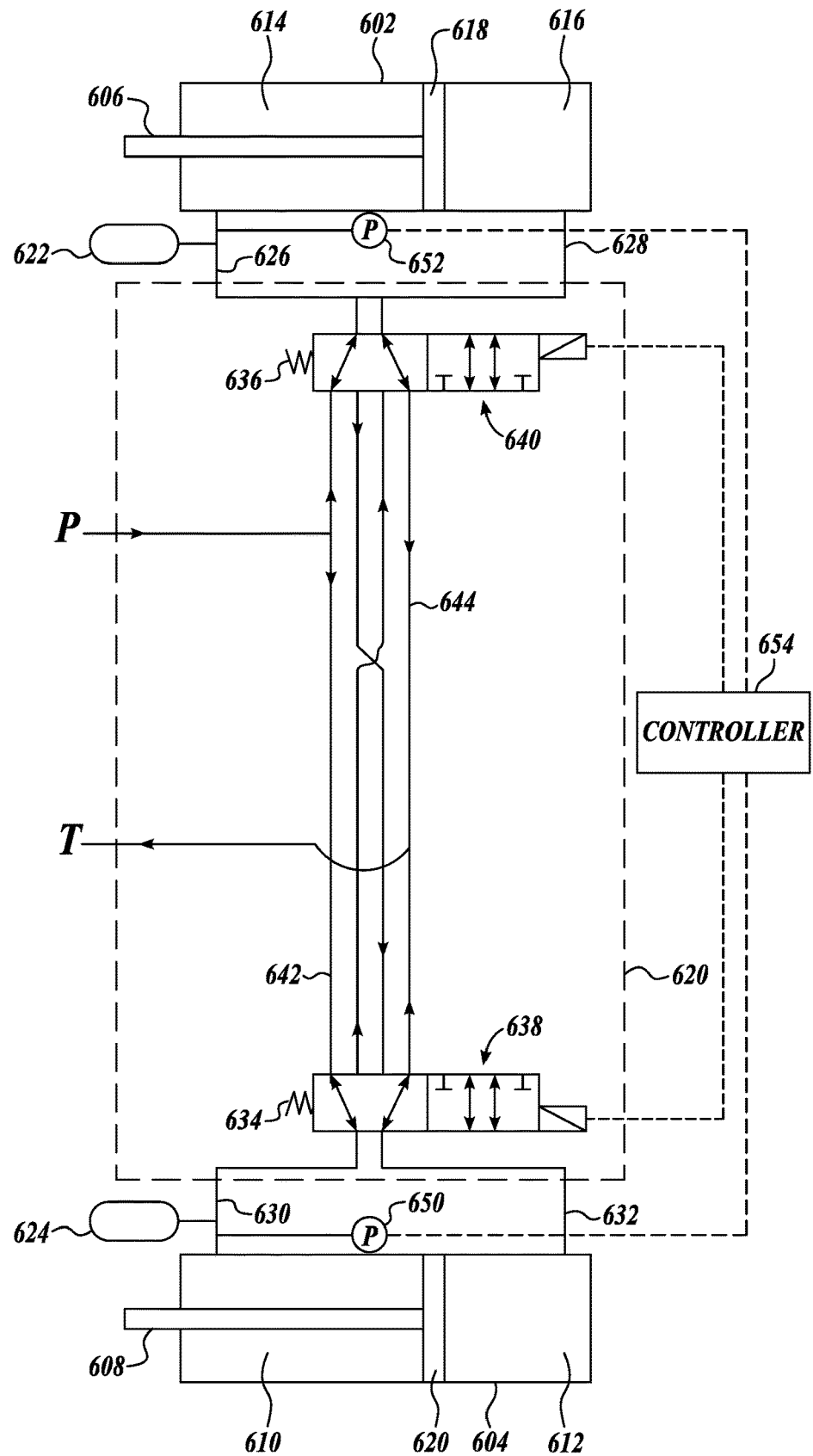
FIGS. 9A and 9B are schematic illustrations of one embodiment of a hydraulic manifold of the hydraulically powered system of FIG. 8

FIG. 9A is a schematic illustration of one example of a hydraulic manifold 620 for the retracting system of FIG. 8. One aim of a suitable hydraulic manifold 620 is to relieve the pressure side chambers 614, 610 of each respective hydraulic cylinder 602, 604 to the tank side chambers 616, 612 of the opposite hydraulic cylinder. FIG. 9A schematically shows the use two 6-way 2-position valves 638, 640. However, each 6-way 2-position valve 638, 640 can be replaced with the use of two or three 4-way 2-position valves to achieve a similar result as each 6-way 2-position valve illustrated.

FIG. 9A shows the manifold 620 with valves 638, 640 in the position when the vessel is foiling, and the struts 102, 104 are in the down position. Pressure is supplied to the pressure side chamber 610 of cylinder 604 and to the pressure side chamber 614 of cylinder 602 to keep the struts 102, 104 tensioned in the forward direction. The valve 640 is in position to allow pressure from line 642 into the chamber 614 through line 626. In one embodiment, line 626 or chamber 614 is connected to an accumulator 626 to smooth out and dampen pressure spikes such that may occur on impact. The valve 638 is in position to allow pressure from line 642 into the chamber 610 through line 630. In one embodiment, line 630 or chamber 610 is connected to an accumulator 624 to smooth out and dampen pressure spikes such that may occur on impact.

The valve 640 is in position to allow the tank side chamber 616 to vent to tank line 644 through line 628. The valve 638 is in position to allow the tank side chamber 612 to vent to tank line 644 through line 632.

A pressure sensor 652 monitors pressure in chamber 614, and a pressure sensor 650 monitors pressure in chamber 610. The pressure sensors 650 and 652 may be used to control the correct amount of forward tension on the struts 102, 104 when foiling, and to detect when an impact occurs. Both pressure sensors 650 and 652 can send pressure signals to a controller 654. Both valves 638 and 640 can include electrically actuated solenoids that receive actuation signals from the controller 654. Controller 654 allows user input to select the forward tension applied to the struts 102, 104 and to select the pressure limit which determines an impact and to actuate valves 638 and 640.

Figure 9B:
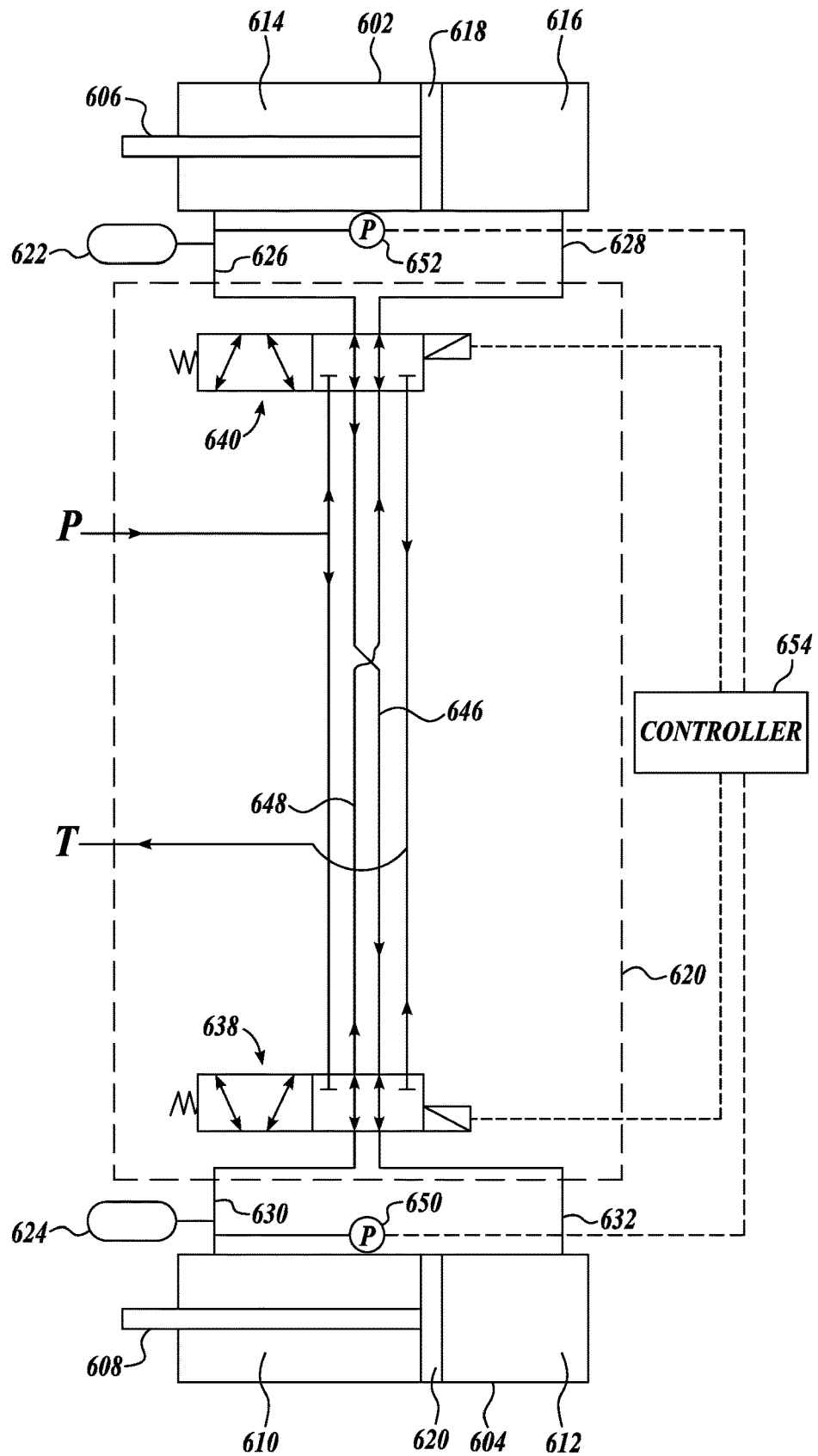

FIG. 9B shows valves 638 and 640 in a position that is actuated, such as by detecting of a pressure above a predetermined limit, such as through impact, so that the pressure side chambers 614, 610 of cylinders 602 and 604 relieve pressure to the tank side chambers 616, 612 of the opposite cylinder at a predetermined flowrate of fluid. The valve 640 is in position to allow pressure from chamber 614 of cylinder 602 to relieve into the tank side chamber 612 of cylinder 604. The valve 638 is in position to allow pressure from chamber 610 of cylinder 604 to relieve to the tank side chamber 616 of cylinder 602. Valves 638 and 640 also close off pressure supply to both cylinders and close off venting to the tank. As the force of an impact retracts the impacted strut, the non-impacted strut is caused to retract by pressurizing the tank side chamber with the hydraulic fluid being pushed out of the pressure side chamber of the impacted strut to the tank side chamber of the non-impacted strut, thus, retracting both struts at similar rates in unison.

In one embodiment, after the struts 102 and 104 are retracted due to an impact, the valves 638 and 640 can be returned to the position shown in FIG. 9A. In this position, valves 638 and 640 connect the pressure side chambers 610 and 614 to the pressure line 642 and connect the tank side chambers 612 and 616 to the tank line 644 causing the pistons 606, 608 to return the struts 102 and 104 to the down position and apply the appropriate tension.

Figure 10:
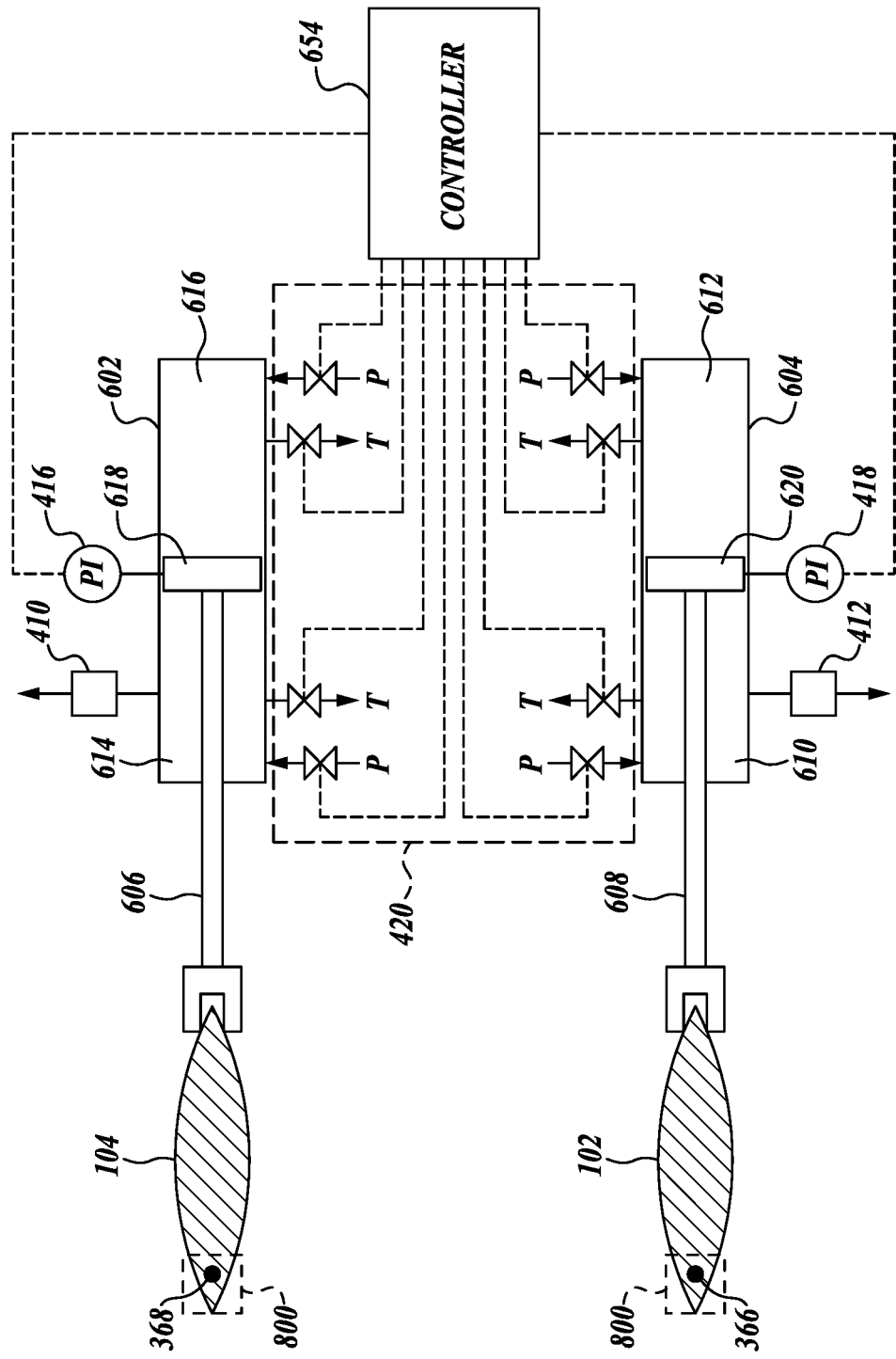
FIG. 10 is a schematic illustration of a strut-hydrofoil assembly of FIG. 8 modified to use different controls.

FIG. 10 illustrates another example of a retraction system and strut-hydrofoil assembly designed to retract when either strut 102 or 104 or both experience a force greater than a predetermined limit and the foil is configured to articulate to maintain positive lift orientation as the struts are retracting. FIG. 10 has struts 102 and 104 as described in the foregoing examples where like numbers represent like parts. Similar to FIG. 8, the struts 102 and 104 each has a dedicated double-acting cylinder 604, 602, respectively. In FIG. 10, the manifold 420 does not use the manifold 620 of FIGS. 8, 9A, and 9B. Each cylinder 604 and 602 can function to apply forward tension on the strut to which it is attached and can also release the tension when the strut experiences a force greater than a predetermined limit. Here, the leading edge of each strut 102, 104 can be connected to a rigid mechanical linkage 608, 606, respectively, which is then connected to the double-acting hydraulic cylinder 604, 616. Cylinder rod ends 608, 606 are shown directly connected to the struts 102, 104 but additional linkages can be included.

The double-acting hydraulic cylinders 604, 602 have two chambers separated by a piston which is connected to the linkages leading to the struts. Hydraulic cylinder 604 has the first chamber 610 and the second chamber 422 separated by the piston 620. In a double-acting, hydraulic cylinder, the first chamber 610 is able to be configured to connect both to a pressure supply and a tank vent through one or more valves through the manifold 420. In a double-acting cylinder, the second chamber 612 is able to be configured to connect both to a pressure supply and a tank vent through one or more valves through a manifold 420. Therefore, either chamber 610 or 612 can be pressurized by opening the pressure valve to allow fluid in, closing the tank valve on the one chamber to prevent fluid out, while opening the tank valve and closing the pressure valve on the second chamber to allow fluid out.

Similarly, hydraulic cylinder 602 has the first chamber 614 and the second chamber 616 separated by the piston 618. In a double-acting, hydraulic cylinder, the first chamber 614 is able to be configured to connect both to a pressure supply and a tank vent through one or more valves through the manifold 420, and the second chamber 616 is able to be configured to connect both to a pressure supply and a tank vent through one or more valves through the manifold 420. Therefore, either chamber 614 or 616 can be pressurized by opening the pressure valve to allow fluid in, closing the tank valve on the one chamber to prevent fluid out, while opening the tank valve and closing the pressure valve on the second chamber to allow fluid out.

In FIG. 10, the valves are illustrated as single valves; however, all valves for both cylinders 608 and 606 can be provided within the manifold 420 that includes the illustrated valves as well as additional hydraulic components, such as pressure sensors on all chambers 610, 612, 614, and 616, and safety devices including pressure relief valves. The valves can be electronically controlled valves that receive control signals from a controller 654.

The double-acting hydraulic cylinders 604, 602 are configured to allow retraction of struts 102, 104 in the event of a collision, but also allow the retraction of struts 102, 104 for other purposes, such as for retracting the struts 102, 104 when the vessel is not foiling, and the vessel is entering shallow water and needs to reduce the draft of the vessel.

In the illustrated configuration, the leading edge of the struts 102, 104 are connected to the respective hydraulic cylinders 604, 602. Therefore, when the vessel 100 is traveling at speed, the struts 102, 104 place tension on the linkages 608, 606. When connected to the trailing edges, the linkages 608, 606 will experience compression. In the illustrated example, when the vessel is traveling forward, the struts 102, 104 experience loads tending to push the struts 102, 104 to the rear. To prevent the struts 102, 104 from retracting, all valves on the hydraulic cylinders 406 and 402 can be closed to prevent the pistons 620, 618 from moving.

Chambers 610 and 614 can be designated pressure side chambers and chambers 612 and 616 can be designated tank side chambers as this is the normal operating condition. The pressure side chamber 610 applies tension on the piston 620 to keep the strut 102 in the un-retracted down position. The pressure within chamber 610 can be monitored with a pressure sensor to apply the correct amount of tension on the strut 102 and to determine when an impact occurs. The pressure side chamber 614 applies tension on the piston 618 to keep the strut 104 in the un-retracted down position. The pressure within chamber 614 can be monitored with a pressure sensor to apply the correct amount of tension on the strut 104 and to determine when an impact occurs. When the vessel is traveling, the pistons 620, 618 experience a force tending to move the pistons in the direction of the force experienced on the struts. Therefore, the pressure in chamber 610 of cylinder 604 and the pressure in chamber 614 of cylinder 602 are subjected to the forces experience by the struts 102, 104.

In one example, a pressure relief valve 412 is connected to the chamber 610 of cylinder 604, and a pressure relief valve 410 is connected to the chamber 614 of cylinder 602. When a sudden load is placed on one or both of the struts 102, 104 or on the hydrofoil 106 by a collision, one or both relief valves 412, 410 will open at a predetermined pressure limit and relieve pressure at a predetermined flowrate out of the chamber to which such valve is connected. The electronic control system senses a change in pressure in one or both of the chambers 610 or 614 via pressure sensors. The impacted strut or struts 102 or 104 retract with the sudden load and because the lift and/or drag generated by the foil causes rotation of the struts to the rear. The rate of retraction can be related to the loss of pressure and the designed fluid flowrate in the respective pressure side chamber. Upon retracting, the position of the struts 102, 104 is measured by respective position indicators 418 and 416. The position of the struts 102, 104 is conveyed to the controller 654. The controller 654 controls the respective manifold valves on the non-impacted strut so that both hydraulic cylinders 604, 602 are caused to retract in unison at the same rate. For example, if only strut 102 is impacted, the pressure relief valve 412 will open, and a corresponding retraction of the strut 102 will occur at a rate determined by the relief valve settings. The controller 654 immediately senses movement of the position of the strut 102 through position sensor 418, and the controller 654 actuates the manifold valves on the second hydraulic cylinder 602 to retract the non-impacted strut 104 at the same rate in unison with the impacted strut 102 by using the position sensor 416 of the non-impacted strut 104. For example, the normally tank side chamber 616 is pressurized and the normally pressure side chamber 614 is open to tank to retract the non-impacted strut 104 in unison with strut 102. However, even the impacted strut 102 can be assisted with retraction by pressurizing the normally tank side chamber 612 and opening the normally pressure side chamber 610 to tank.

Further, the controller 654 can be used to return the struts 102 and 104 to the position before the impact by pressurizing the pressure side chambers 610 and 614 of respective cylinders 604 and 602. In one embodiment, the struts 102, 104 can be intentionally retracted on command using the controller 654. To retract struts 102, 104, the controller 654 is used to pressurize the normally tank side chambers 612 and 616 and vent the normally pressure side chambers 610, 614. Intentional retraction of struts 102, 104 may be necessary, for example, when traveling over shallow water.

Figure 11B:
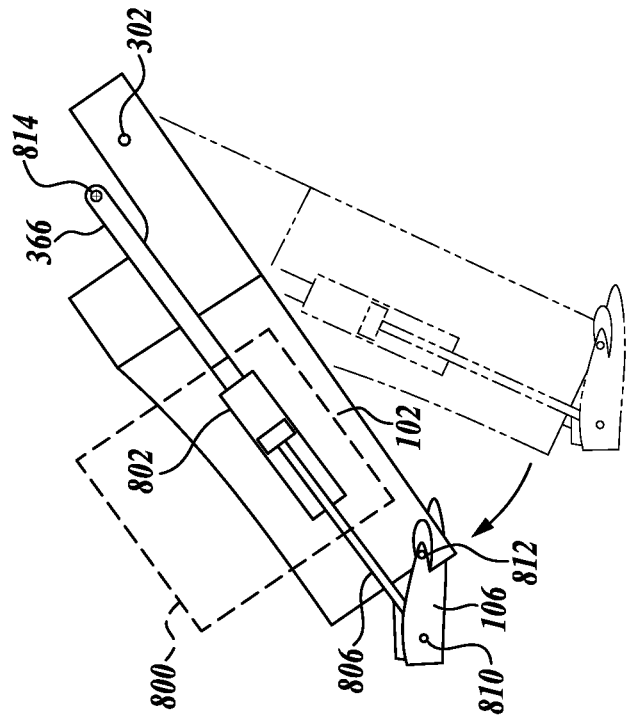
FIGS. 11A and 11B are schematic illustrations of foil angle of attack control used with strut retraction.
Figure 11A:
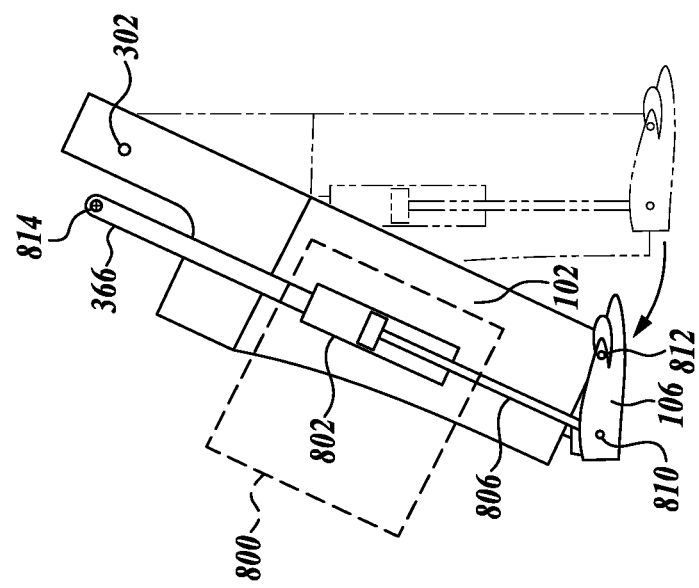

FIGS. 11A and 11B shows an example of using the hydraulic flight control system 800 described in relation to FIG. 3B used for controlling the angle of attack of the hydrofoil 106 when the struts 102, 104 retract due to a collision.

In one example, with reference to FIG. 3B, 11A, and 11B, the controller 804 controls the angle of attack of the foil based on the position of the ram arm 806 using a position indicator. In one example, the strut 102 may also include a position indicator which detects the angle of the strut 102.

When the strut 102 is in a nearly vertical or down position, the angle of attack of the hydrofoil will correlate to a position of the piston 810. The controller may apply an equal pressure to both upper and lower chambers or keep all valves closed to keep the hydrofoil 106 from rotating. As the angle of the strut 102 increases from the vertical as illustrated in FIGS. 11A and 11B, the controller 804 adjusts the position of the piston 810 to keep the hydrofoil 106 at the desired angle of attack by opening the pressure valve to the upper cylinder and venting the lower cylinder to tank. The same actions are occurring with respect to the second strut 104 that has a similar cylinder to minimize any twist in the hydrofoil 106. In another embodiment, instead of using position indicators, the controller 804 may sense the pressure on both chambers, and control the pressure as the strut 102 is retracted up. In another embodiment of the flight control system 800, the ram arm 806 remains fixed on impact. In this case, the arm 366 together with the ram arm 806 define a fixed length arm with rotates aft in parallel with the strut 102 so that the arm 366 together with the ram arm 806 can rotate the hydrofoil 106 simultaneously relative to the strut 102 as the strut 102 is retracting which maintains the positive lift orientation on the foil. In another embodiment, the controller 804 may vent both chambers of the cylinder 802 to tank and allow the hydrofoil 106 to find its own position according to the forces acting upon it as the struts retract. In another embodiment, there is no control used at all, the foil 106 orientation relies on a relief pressure and mechanics to move the foil 106. In this embodiment, neither the controller 804 nor position indicator are used, but rather the cylinder 802 only allows hydraulic flow and therefore the foil 106 to retract when adequate pressure is encountered. In this case, the hydraulic flow and therefore the rate of foil retraction will be controlled by the design of the piping system. In this case, the retraction force is from the collision itself.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for retracting a foil of a watercraft in an event of an impact comprising:
   a strut extending from a watercraft, wherein the strut has a pivot at one end that connects the strut to the watercraft and allows the strut to articulate around the pivot;
   a foil attached at a second end of the strut, wherein the foil has sufficient surface area configured to generate positive lift when the watercraft is traveling over water; and
   a retraction system including a mechanical fuse connected to the strut, the mechanical fuse holds the strut stationary and is subject to forces from the strut when the strut travels through water, the retraction system allows retraction of the strut around the pivot when the strut experiences a force greater than a predetermined limit, and the foil is configured to articulate on the strut to maintain positive lift orientation as the strut is retracting, and
   comprising a first strut and a second strut, both first and second struts extend from the watercraft, both the first and second struts have a pivot at one end that connect each strut to the watercraft and allows the strut to articulate around the pivot; the foil is attached at a second end of each of the first and second struts, wherein the retraction system further comprises a first cable connected to the first strut, a second cable connected to the second strut, a tensioner connected to the first and second cables that applies forward force to maintain the first and second strut in a foiling position, and the mechanical fuse is connected to a point where the first and second cables are joined together or subsequently the tensioner to release the forces when either of the first or the second struts or both experience a force greater than a predetermined limit.

2. The system of claim 1, further comprising a third cable and a fourth cable, wherein the third cable connects the first strut to the second strut wherein a force on the first strut is applied to retract the second strut, and the fourth cable connects the second strut to the first strut, wherein a force on the second strut is applied to retract the first strut, wherein the third cable connects a leading edge of the first strut to a trailing edge of the second strut, and the fourth cable connects a leading edge of the second strut to a trailing edge of the first strut.

* * * * *